United States Patent [19]

Harada et al.

[11] Patent Number: 4,792,211
[45] Date of Patent: Dec. 20, 1988

[54] FERROELECTRIC LIQUID CRYSTAL ELECTRO-OPTICAL DEVICE HAVING HIGH WATER REPELLENT ALIGNMENT LAYER

[75] Inventors: Takamasa Harada; Masaaki Taguchi; Sadashi Shimoda; Koukichi Ito, all of Tokyo, Japan

[73] Assignee: Seiko Instruments & Electronics Ltd., Tokyo, Japan

[21] Appl. No.: 908,345

[22] Filed: Sep. 17, 1986

[30] Foreign Application Priority Data

Sep. 18, 1985 [JP] Japan ................. 60-205652

[51] Int. Cl.$^4$ .............................................. G02F 1/13
[52] U.S. Cl. .................................. 350/341; 350/339 R; 350/350 S
[58] Field of Search .............. 350/341, 339 R, 350 S, 350/337, 343, 349; 424/52; 260/448.8 R

[56] References Cited

U.S. PATENT DOCUMENTS

| Re. 29,211 | 5/1977 | Lewis ................. 260/448.8 R |
| Re. 31,787 | 1/1985 | Chang ................. 424/52 |
| 4,340,646 | 6/1982 | Ohno et al. ........... 350/320 |
| 4,357,374 | 11/1982 | Ogawa ................ 350/349 |
| 4,367,924 | 1/1983 | Clark et al. .......... 350/350 S |
| 4,563,059 | 1/1986 | Clark et al. .......... 350/350 S |
| 4,662,721 | 5/1987 | Harada et al. ........ 350/339 R |

FOREIGN PATENT DOCUMENTS 0160302 11/1985 European Pat. Off.
0168242 1/1986 European Pat. Off.
3502160 7/1985 Fed. Rep. of Germany.

Primary Examiner—Stanley D. Miller
Assistant Examiner—Huy K. Mai
Attorney, Agent, or Firm—Bruce L. Adams; Van C. Wilks

[57] ABSTRACT

A ferroelectric liquid crystal electro-optical device utilizes a liquid crystal layer composed of ferroelectric liquid crystal molecules. A first alignment layer is disposed in contact with the liquid crystal layer and has a uniaxial alignment characteristic effective to align the molecular axes of liquid crystal molecules immediately adjacent to the first alignment layer in a predetermined direction parallel to the liquid crystal layer. A second adjacent layer is opposed to the first alignment layer in contact with the liquid crystal layer. The second alignment layer has a random homogeneous alignment characteristic and a water repellency characteristic defined in terms of a water contact angle of more than 70° jointly effective to align the molecular axes of liquid crystal molecules immediately adjacent to the second alignment layer in either of two orientation directions oppositely inclined relative to the predetermined direction in parallel to the liquid crystal layer. An electric field is applied to the liquid crystal molecules to switch the molecules between the two orientation directions to drive the electro-optical device.

15 Claims, 5 Drawing Sheets

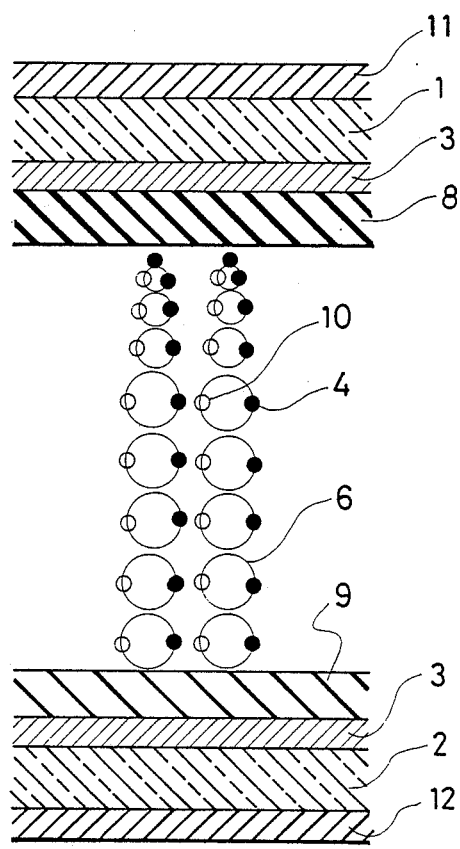
F I G. 1

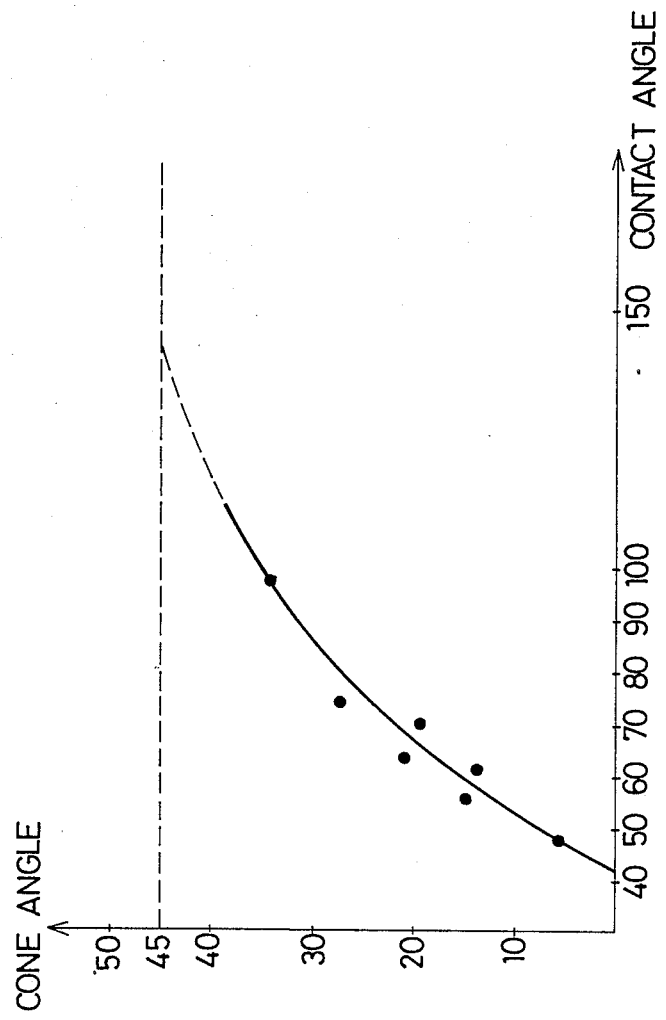

FERROELECTRIC LIQUID CRYSTAL ELECTRO-OPTICAL DEVICE HAVING HIGH WATER REPELLENT ALIGNMENT LAYER

BACKGROUND OF THE INVENTION

This invention relates to an electro-optical device such as a display device, a shutter array for printers, a shutter for camera or an optical shutter for window, using a ferroelectric liquid crystal having a ferroelectric property. More particularly, the present invention relates to an improvement in an alignment treatment which controls the arrangement of liquid crystal molecules.

Conventionally, electro-optical devices produced by sandwiching a ferroelectric chiral smectic liquid crystal between two substrates have been known in the past.

Such a ferroelectric liquid crystal device is described in U.S. Pat. Nos. 4,367,924 and 4,563,059 (Clark et al.).

We have filed the related application (Ser. No. 750,092) with respect to a ferro-electric liquid crystal electro-optical device in which alignment treatment having uniaxial alignment characteristic is applied to one of the substrates and random alignment treatment having non-alignment characteristic is applied to the other substrate, in order to rearrange the liquid crystal molecules in a bi-stable state. In other words, the liquid crystal molecules that are arranged in one stable state are rearranged in the other stable state by applying a voltage in order to utilize the optical change occurring thereby.

However, the conventional ferroelectric chiral smectic liquid crystal electro-optical devices involve the following problems.

First of all, no suitable material which provides random alignment to the liquid crystal molecules has been found. Since physical properties to be satisfied by a preferred material are not clarified, the selection of the material must be made by the method of trial and error. In addition, it has not been possible by use of the conventional random alignment materials to establish a clear and stable bi-stable state of the liquid crystal molecules. As a result, the light transmission cutoff contrast resulting from the change-over of the alignment state of the liquid crystal molecules in the bi-stable state by the application of a voltage is not sufficiently high.

SUMMARY OF THE INVENTION

One of the objects of the present invention is to provide an improved ferroelectric liquid crystal electro-optical device having a high contrast.

Another object of the present invention is to provide an improved alignment layer effective to establish a stable orientation state of the ferroelectric liquid crystal.

BRIEF DESCRIPTION OF THE DRAWING

FIG. 1 is a sectional view of a ferroelectric liquid crystal electro-optical device;

FIG. 10 is a diagram showing the contact angle-cone angle characteristics.

DETAILED DESCRIPTION OF THE INVENTION

Figure 2:
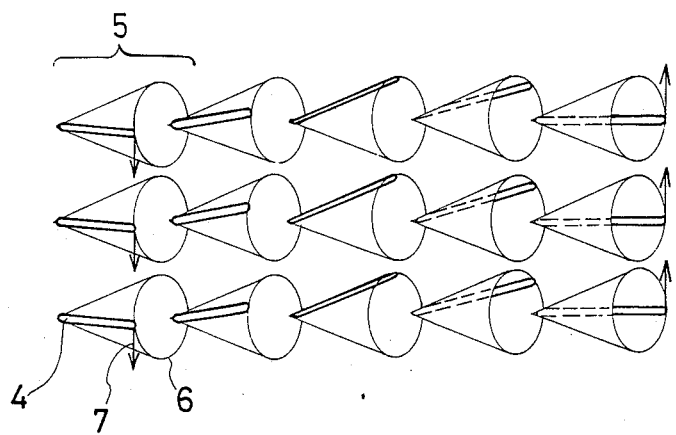
FIG. 2 is a schematic view showing the molecular arrangement of a chiral smectic liquid crystal.

The present invention is directed to solve the problems of the prior art described above, and provides a ferroelectric liquid crystal electro-optical device having a structure shown in FIG. 1. In this drawing, reference numerals 1 and 2 represent two substrates that are disposed in parallel with each other. At least one of the substrates is transparent. Reference numeral 3 represents an electrode film formed on the inner surface of the substrate, which is used for applying a voltage to liquid crystal molecules. Reference numeral 4 represents a ferroelectric, chiral smectic liquid crystal molecule sandwiched between the substrates 1 and 2.

FIG. 2 shows an ordinary molecular arrangement of a chiral smectic liquid crystal. The liquid crystal molecules 4 constitute a layer 5. In this drawing, five layers are shown from the left to the right. The direction of the major axis of the liquid crystal molecule (hereinafter called a "molecular axis") in one layer is inclined by an angle $\theta$ relative to the normal direction of the layer 5, and this angle is the same in all the layers. On the other hand, the heads of the liquid crystal molecules 4 contained in the same layer are locted at the same position on the circumference of an imaginary cone 6. This position rotates and shifts along the circumference of the cone 6 for each layer. Moreover, the molecular axis rotates for each layer relative to the normal direction of the layer, and the molecular orientation assumes a spiral structure.

On the other hand, chiral smectic liquid crystals in general not only assume the spiral structure but have dipoles and exhibit ferroelectricity in a direction perpendicular to the molecular axis.

An example of the chiral smectic liquid crystals is P-deciloxybenzilidene P'-amino-2-mitylbutyl cynnamate of the following formula:

Turning back again to FIG. 1, the spiral structure described above disappears if the gap between the substrates 1 and 2 is smaller than the pitch of the spiral, such as about 1 $\mu$m.

In other words, the molecular axis is approximately in parallel with the substrates and the liquid crystal molecules are arranged at an angle $\theta$ from the direction of the normal of the layer. Here, the normal direction of the layer is approximately in parallel to the substrates. Therefore, the layer is formed perpendicularly to the substrates.

In FIG. 1, reference numeral 8 represents an alignment film having uniaxial alignment characteristic. The uniaxial alignment characteristic can be obtained by rubbing a thin layer made of an organic film such as polyimide, polyamide, polyamideimide, poly vinyl alcohol, fluorine-contained polymer and silane or by obliquely evaporating inorganic material such as $SiO_2$ or $MgF_2$. Uniaxial alignment treatment fixes adjacent liquid crystal molecules approximately in parallel to the substrates in one direction. Liquid crystal molecules in the bulk, however, may tilt a little. FIG. 1 is a view when viewed from the uniaxial alignment direction. Reference numeral 9 represents a random alignment treatment film having no directivity, composed of a high water repellent material and disposed on the inner surface of the substrate 2. It is assumed that this random alignment does not limit the direction of the adjacent liquid crystal molecules but has a function of arranging them substantially parallel to the substrates. In the case of the present invention, the random alignment is effective to make free the contact interface between the liquid crystal molecule domain that has grown due to the influences of the uniaxial orientation and the molecule domain in the random range. Here, the term "free" means that the interaction of the upper and lower liquid crystal molecules divided by the interface relatively small. For this reason, the arrangement of the liquid crystal molecules that have grown from the uniaxial alignment film can take positions that are originally the most stable.

These positions are two-fold or bi-stable and are represented by black circles 4 and white circles 10 in FIG. 1. In other words, a bi-stable state can be established. Ideally, these positions are horizontal to the substrates and lie on a line that crosses the imaginary cone 6 and the horizontal plane. They are the positions of angles $\pm\theta$ relative to the normal direction of the layer (perpendicular to the sheet of the drawing in FIG. 1).

Figure 3:
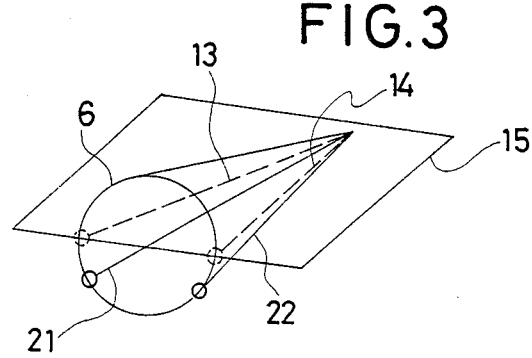
FIG. 3 is a schematic view showing ideal positions and actual positions of the molecules.

However, in the conventional alignment treatment, the molecules are slantingly oriented relative to the substrates (at positions of molecules represented by reference numerals 21 and 22 in FIG. 3). In this case, when the molecules are observed from above the electro-optical device, the cone angle becomes smaller than the ideal cone angle when the liquid crystal molecules are arranged at the ideal positions 13 and 14. Since the contrast is optically determined by this apparent or effective cone angle, the conventional alignment can provide only a low contrast.

Now, when random alignment treatment is carried out by use of a high water repellent material as in the present invention, the liquid crystal molecules can be arranged in the ideal bi-stable state described above. Hereinafter, the reason will be described. Incidentally, reference numerals 11 and 12 in FIG. 1 represent two polarizers whose axis of polarization crosses each other and which convert the switching of the liquid crystal molecules between their bi-stable state to an optical change.

Figure 4:
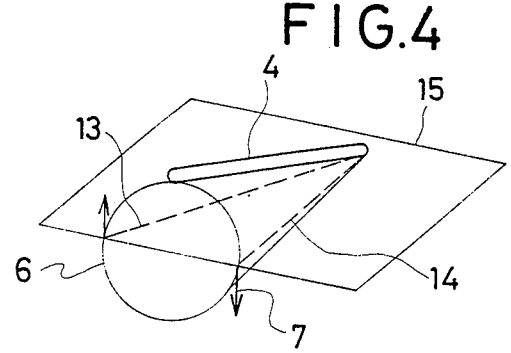
FIG. 4 is a schematic view showing a bi-stable state of a liquid crystal molecule.

FIG. 4 shows an ideal bi-stable state which is established when random homogeneous alignment treatment is conducted by use of a water repellent material. In other words, the liquid crystal molecule 4 is arranged on the crossing line 13 or 14 of the imaginary horizontal plane 15 perpendicular to the imaginary cone 6 and parallel to the substrate. The angle of the molecular axis of the liquid crystal molecule between the two stable positions is $2\theta$ and is ideally 45°.

Figure 5:
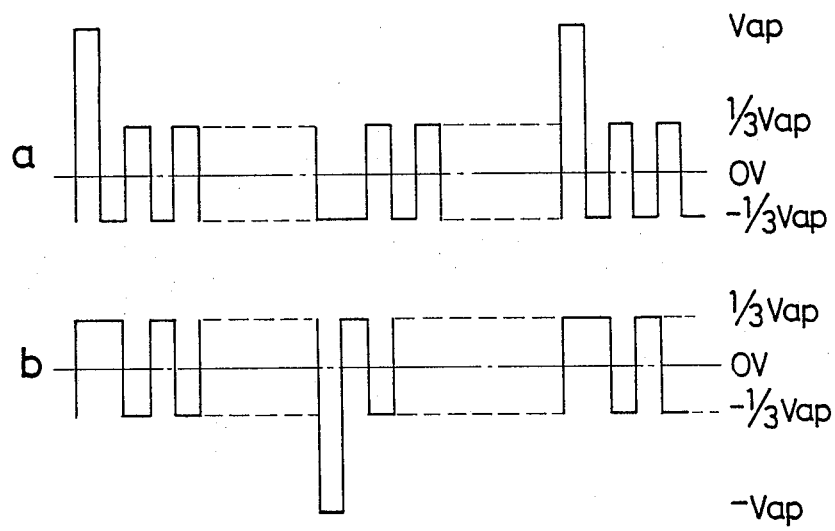
FIG. 5 is a driving waveform diagram.

FIG. 5 shows a driving waveform diagram for changing over the arrangement of the liquid crystal molecules between the bi-stable states described above and for making electro-optical switching. A waveform (a) represents one that is used for shifting the first stable state to the second stable state, and a voltage $+V_{ap}$ is applied in a direction which is parallel to the dipole of the liquid crystal molecule but in the opposite direction. The dipole receives the force of repulsion, moves along the orbit of the imaginary cone and shifts to the second stable state. At this time, the direction of the dipole 7 is inverted (see FIG. 4). An a.c. pulse $\pm\frac{1}{3}V_{ap}$ following the pulse $+V_{ap}$ is effective to keep the liquid crystal molecules in the stable state.

The waveform (b) is a driving waveform for shifting the second stable state to the first stable state. Since the direction of the dipole is opposite to that described above, switching-driving is effected by a pulse having a voltage $-V_{ap}$.

Figure 6:
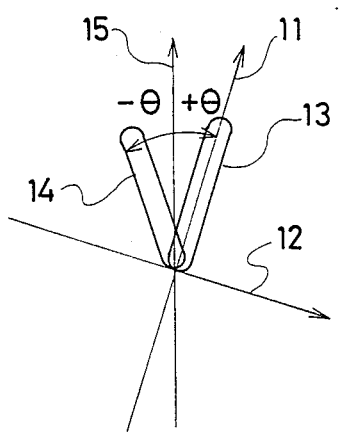
FIG. 6 is a view for explaining the driving principle of the device.

FIG. 6 shows the principle of driving when the electro-optical device of this invention is observed from above. The axis of polarization of the polarizer 11 on the incident side registers with the first stable position 13. The axis of polarization of the polarizer 12 on the outgoing side is rotated by 90° from that of the polarizer 11 on the incident side. When the liquid crystal molecules are at the first stable position 13, the ray of right polarized by the polarizer 11 on the incident side reaches the polarizer 12 on the outgoing side without changing the direction of polarization, but no ray of light comes out from the outgoing side because both polarizers cross each other at right angles. This is the light cut-off state. When the liquid crystal molecules move to the second stable position 14, on the other hand, the ray of light is radiated in the direction of the crossing polarizer on the outgoing side, too, due to birefringence of the liquid crystal. In the case of the present invention, the angle $2\theta$ of the molecular axis of the liquid crystal molecules which are under the bi-stable state (hereinafter, this $2\theta$ will be called a "cone angle") is approximate to $2\times 22.5°=45°$ because the ideal bi-stable state is established. Therefore, most of the rays of light direct in the polarization direction of the polarizer on the outgoing side. This is the light transmission state. Incidentally, in order to make ideal optical switching described above, the following relation must be satisfied between a cell thickness d and anisotropy $\Delta n$ of the refractive index of the liquid crystal:

$$d=(2n-1)a/\Delta n$$

where
 $a: c\pi/\omega$,
 n: refractive index,
 c: light velocity,
 $\omega$: light angular frequency.

The reason why the ideal orientation state can be established approximately is that the liquid crystal molecules are substantially aligned horizontal to the substrates and the cone angle approaches to the maximum.

[Embodiment]

Figure 7:
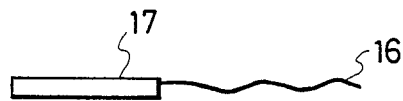
FIG. 7 is a schematic view of an A-B type block polymer.

An A-B type block polymer was used as a random homogeneous alignment agent having water repellency. The A-B type block polymer shown in FIG. 7 was composed of a functional segment 16 having excellent surface modifying property and a compatible segment 17 which was compatible with the resin. In this embodiment, the A-B type block polymer was composed of fluorinated alkyl group as the functional segment and an acrylic polymer as the compatible segment.

Figure 8:
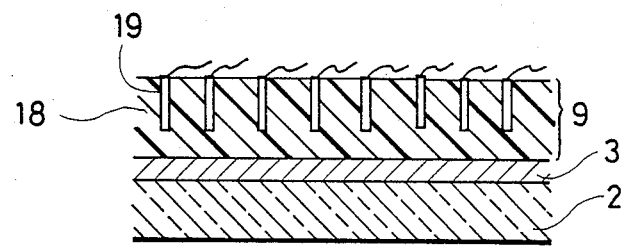
FIG. 8 is a sectional view of a water repellent random alignment film.

FIG. 8 is a sectional view of a water repellent random alignment film in accordance with this embodiment.

10% of the A-B type block polymer was added to the acrylic monomer solution, and the solution was coated on the surface of the substrate 2 and the substrate was then baked at 200° C. The acrylic resin film 18 was thus formed on the surface of the substrate 2 and the compatible segment 17 of the A-B type block polymer 19 was fixed therein. On the other hand, the functional segment was exposed from and oriented to the surface and exhibited water repellency.

Figure 9:
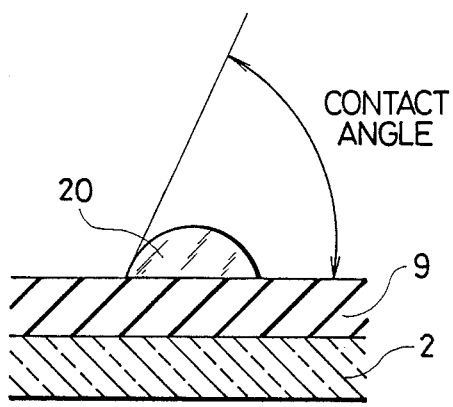
FIG. 9 is an explanatory view of a water contact angle.

A contact angle shown in FIG. 9 was used as a scale representing water repellency. The contact angle represents an angle between water droplet 20 and the surface of the alignment film 9, and the greater the contact angle, the higher the water repellency of the film.

Incidentally, the contact angle was 96.7° in this embodiment.

Next, the contact angles, the apparent or effective cone angles and light cut-off/transmission contrast were measured for various materials for the sake of comparison. The results are illustrated in the following table.

| random homogeneous alignment material | contact angle | cone angle | contrast |
|---|---|---|---|
| A-B block polymer + acrylic resin | 96.7° | 34° | 11 |
| organic silane, vertical alignment + heating at 300° C. | 74° | 27.5° | — |
| polyimide | 71.2° | 19° | 11.3 |
| Photosensitive polyamide | 66.5° | 14° | 1.3 |
| ethyl metachrylate | 64° | 22° | 3.8 |
| cellulose acetate | 57.2° | 15° | 1.9 |
| polyvinyl alcohol | 39° | 6° | 1.2 |

FIG. 10 is a diagram showing the relation between the contact angle and the apparent cone angle in the table above. It can be understood from FIG. 10 that the greater the contact angle, that is, the higher the water repellency, the closer the apparent cone angle to the ideal angle 45°. Therefore, the light cut-off/transmission contrast, too, is improved as much. This is because the higher the water repellency, the more closely are oriented the liquid crystal molecules to the horizontal state. In practice, sufficient contrast can be obtained if the contact angle is at least 90° as in this embodiment. In orientation with tilt of the molecular axis relative to the substrate, on the other hand, the cone angle becomes smaller than the ideal angle and hence, the contrast becomes worse.

Incidentally, an example of uniaxial orientation methods include one that forms the polyimide film by printing or dipping and then rubs it uni-directionally.

Since the present invention uses a material having water repellency as a random homogeneous alignment material, the cone angle approaches the ideal value and the light cut-off/transmission contrast can be improved drastically.

What is claimed is:

1. A ferroelectric liquid crystal electro-optical device comprising: two opposed plates having electrodes, the inner surface of one of said two plates having a uniaxial alignment characteristic and the inner surface of the other of said two plates having a high water repellent alignment layer with a random alignment characteristic, the high water repellent alignment layer having a contact angle of at least 80° with respect to a water droplet; and ferroelectric liquid crystal sandwiched between said two plates.

2. A ferroelectric liquid crystal electro-optical device as claimed in claim 1; wherein the high water repellent alignment layer contains an A-B type block polymer.

3. A ferroelectric liquid crystal electro-optical device as claimed in claim 2; wherein the A-B type block polymer comprises a functional segment providing water repellency and a compatible segment which is compatible with a resin forming the alignment layer.

4. A ferroelectric liquid crystal electro-optical device as claimed in claim 3; wherein the functional segment comprises a fluorinated alkyl group.

5. A ferroelectric liquid crystal electro-optical device as claimed in claim 3; wherein the resin forming the alignment layer comprises acrylic resin and the compatible segment comparible with the resin comprises acrylic polymer.

6. A ferroelectric liquid crystal electro-optical device as claimed in claim 1; wherein the uniaxial alignment characteristic is obtained by rubbing a thin layer or obliquely evaporating a thin layer made of at least one of polyimide, polyvinyl alcohol, fluorine-contained polymers, silane and $SiO_2$, the thin layer being provided on the inner surface of one of the two plates.

7. A ferroelectric liquid crystal electro-optical device comprising: a liquid crystal layer composed of ferroelectric liquid crystal molecules each having a molecular axis; a first alignment layer disposed in contact with the liquid crystal and having a uniaxial alignment characteristic effective to align the molecular axes of liquid crystal molecules immediately adjacent to the first alignment layer in a predetermined direction parallel to the liquid crystal layer; a second alignment layer opposed to the first alignment layer and in contact with the liquid crystal layer, the second alignment layer having a random homogeneous alignment characteristic and a water repellency characteristic defined in terms of a water contact angle of more than 70° jointly effective to align the molecular axes of liquid crystal molecules immediately adjacent to the second alignment layer in either of two orientation directions oppositely inclined relative to the predetermined direction in parallel to the liquid crystal layers; and means for applying an electric field to the liquid crystal molecules to switch between the two orientation directions.

8. A ferroelectric liquid crystal electro-optical device as claimed in claim 7; wherein the second alignment layer comprises a base polymer, and an additional polymer added to the base polymer effective to impart to the base polymer a water repellency characteristic.

9. A ferroelectric liquid crystal electro-optical device as claimed in claim 8; wherein the additional polymer comprises an A-B type block polymer composed of a functional segment having a water repellency characteristic and a compatible segment compatible with the base polymer.

10. A ferroelectric liquid crystal electro-optical device as claimed in claim 9; wherein the functional segment comprises a fluorinated allkyl group.

11. A ferroelectric liquid crystal electro-optical device as claimed in claim 10; wherein the compatible segment comprises an acrylic group and the base polymer comprises an acrylic polymer.

12. A ferroelectric liquid crystal electro-optical device as claimed in claim 7; wherein the second alignment layer has a water repellency characteristic defined in terms of a water contact angle of more than 80°.

13. A ferroelectric liquid crystal electro-optical device as claimed in claim 7; wherein the second alignment layer has a water repellency characteristic effective to establish an angular difference of more than 19° between the two orientation directions.

14. A ferroelectric liquid crystal electro-optical device as claimed in claim 7; wherein the first alignment layer comprises an organic film rubbed in a predetermined direction and composed of a polymer selected from the group consisting of polyimide, polyamide, polyamideimide, polyvinyl alcohol, fluorine-contained polymer and silane.

15. A ferroelectric liquid crystal electro-optical device as claimed in claim 7; wherein the first alignment layer comprises an obliquely evaporated inorganic film.

* * * * *